United States Patent
Jang et al.

(10) Patent No.: US 11,507,131 B2
(45) Date of Patent: *Nov. 22, 2022

(54) DEVICE INCLUDING DIGITAL INTERFACE WITH MIXTURE OF SYNCHRONOUS AND ASYNCHRONOUS COMMUNICATION, DIGITAL PROCESSING SYSTEM INCLUDING THE SAME, AND DIGITAL PROCESSING METHOD PERFORMED BY THE SAME

(71) Applicant: Samsung Electronics Co., Ltd., Suwon-si (KR)

(72) Inventors: Ho-Rang Jang, Seoul (KR); Ji-Woong Kwon, Seoul (KR); Sang-Wook Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,013

(22) Filed: Mar. 1, 2021

(65) Prior Publication Data

US 2021/0181785 A1 Jun. 17, 2021

Related U.S. Application Data

(63) Continuation of application No. 16/165,447, filed on Oct. 19, 2018, now Pat. No. 10,936,009.

(30) Foreign Application Priority Data

Dec. 26, 2017 (KR) ........................ 10-2017-0179466

(51) Int. Cl.
*G06F 1/12* (2006.01)
*G06F 13/42* (2006.01)
*H04L 7/00* (2006.01)

(52) U.S. Cl.
CPC ............ *G06F 1/12* (2013.01); *G06F 13/4291* (2013.01); *H04L 7/0008* (2013.01)

(58) Field of Classification Search
CPC ....... G06F 1/12; G06F 13/4291; H04L 7/0008
(Continued)

(56) References Cited

U.S. PATENT DOCUMENTS 3,681,529 A 8/1972 Cooper
3,936,807 A 2/1976 Edwards
(Continued)

FOREIGN PATENT DOCUMENTS

JP 2001-268088 A 9/2001
JP 2003-163653 A 6/2003

*Primary Examiner* — Paul R. Myers
(74) *Attorney, Agent, or Firm* — Harness, Dickey & Pierce, P.L.C.

(57) ABSTRACT

A digital processing system including a master chip having a first clock pin and a first data pin and a first slave chip having a second clock pin and a second data pin may be provided. The digital processing system may transmit first data from the master chip to the first slave chip based on a synchronous scheme in which a first clock signal output from the master chip via the first clock pin and the first data output from the master chip via the first data pin are provided together and the first data is transmitted in synchronization with the first clock signal, and may transmit second data from the first slave chip to the master chip based on an asynchronous scheme in which the second data output from the first slave chip via the second data pin is transmitted regardless of the first clock signal.

24 Claims, 12 Drawing Sheets

(58) Field of Classification Search
USPC ........................................................ 713/400
See application file for complete search history.

(56) References Cited

U.S. PATENT DOCUMENTS

| | | | |
|---|---|---|---|
| 4,249,266 A | 2/1981 | Nakamori | |
| 4,353,128 A | 10/1982 | Cummiskey | |
| 4,584,685 A | 4/1986 | Gajjar | |
| 4,635,275 A | 1/1987 | Borg et al. | |
| 4,665,518 A | 5/1987 | Champlin et al. | |
| 4,727,536 A | 2/1988 | Reeves et al. | |
| 4,881,227 A | 11/1989 | Buhren | |
| 4,972,432 A | 11/1990 | Wilson et al. | |
| 5,097,468 A | 3/1992 | Earlie | |
| 5,173,901 A | 12/1992 | DeSomer | |
| 5,305,355 A | 4/1994 | Go et al. | |
| 5,696,994 A * | 12/1997 | Pang | G06F 13/4077 710/63 |
| 5,848,072 A | 12/1998 | Prill et al. | |
| 6,038,400 A | 3/2000 | Bell et al. | |
| 6,233,635 B1 * | 5/2001 | Son | G06F 13/4291 710/315 |
| 6,591,322 B1 | 7/2003 | Ervin et al. | |
| 6,772,251 B1 | 8/2004 | Hastings et al. | |
| 7,190,754 B1 | 3/2007 | Chang et al. | |
| 7,743,273 B2 | 6/2010 | Ohno | |
| 7,849,244 B2 * | 12/2010 | Huang | G06F 13/4291 710/316 |
| 8,832,339 B1 | 9/2014 | Mincher | |
| 9,281,072 B2 | 3/2016 | Lee et al. | |
| 9,292,036 B2 | 3/2016 | Grocutt et al. | |
| 9,755,821 B2 | 9/2017 | Jang et al. | |
| 10,014,056 B1 | 7/2018 | Lee et al. | |
| 10,216,690 B2 | 2/2019 | Zhang et al. | |
| 10,936,009 B2 * | 3/2021 | Jang | G06F 13/4291 |
| 2004/0255195 A1 * | 12/2004 | Larson | G06F 11/221 714/30 |
| 2008/0141059 A1 | 6/2008 | Kim et al. | |
| 2010/0142418 A1 | 6/2010 | Nishioka et al. | |
| 2011/0255549 A1 | 10/2011 | Nakamura et al. | |
| 2012/0089770 A1 | 4/2012 | Kim et al. | |
| 2012/0311211 A1 * | 12/2012 | Gao | G06F 13/4045 710/110 |
| 2013/0058175 A1 | 3/2013 | Lin et al. | |
| 2013/0064321 A1 | 3/2013 | Kopp | |
| 2014/0149615 A1 * | 5/2014 | Fosse | G06F 13/364 710/110 |
| 2014/0149616 A1 * | 5/2014 | Chiang | G06F 13/4291 710/110 |
| 2014/0149617 A1 * | 5/2014 | Chiang | G06F 13/364 710/110 |
| 2014/0223041 A1 * | 8/2014 | Chang | G06F 13/28 710/27 |
| 2017/0041127 A1 * | 2/2017 | Sharpe-Geisler | G01S 15/46 |
| 2018/0013546 A1 | 1/2018 | Jang et al. | |
| 2018/0061478 A1 | 3/2018 | Vergis et al. | |
| 2018/0246665 A1 | 8/2018 | Wang et al. | |
| 2018/0275713 A1 * | 9/2018 | Srivastava | G06F 13/4291 |
| 2019/0095273 A1 | 3/2019 | Graif et al. | |
| 2019/0129464 A1 | 5/2019 | Graif et al. | |
| 2019/0196532 A1 | 6/2019 | Jang et al. | |
| 2020/0044882 A1 | 2/2020 | Itagaki et al. | |

\* cited by examiner

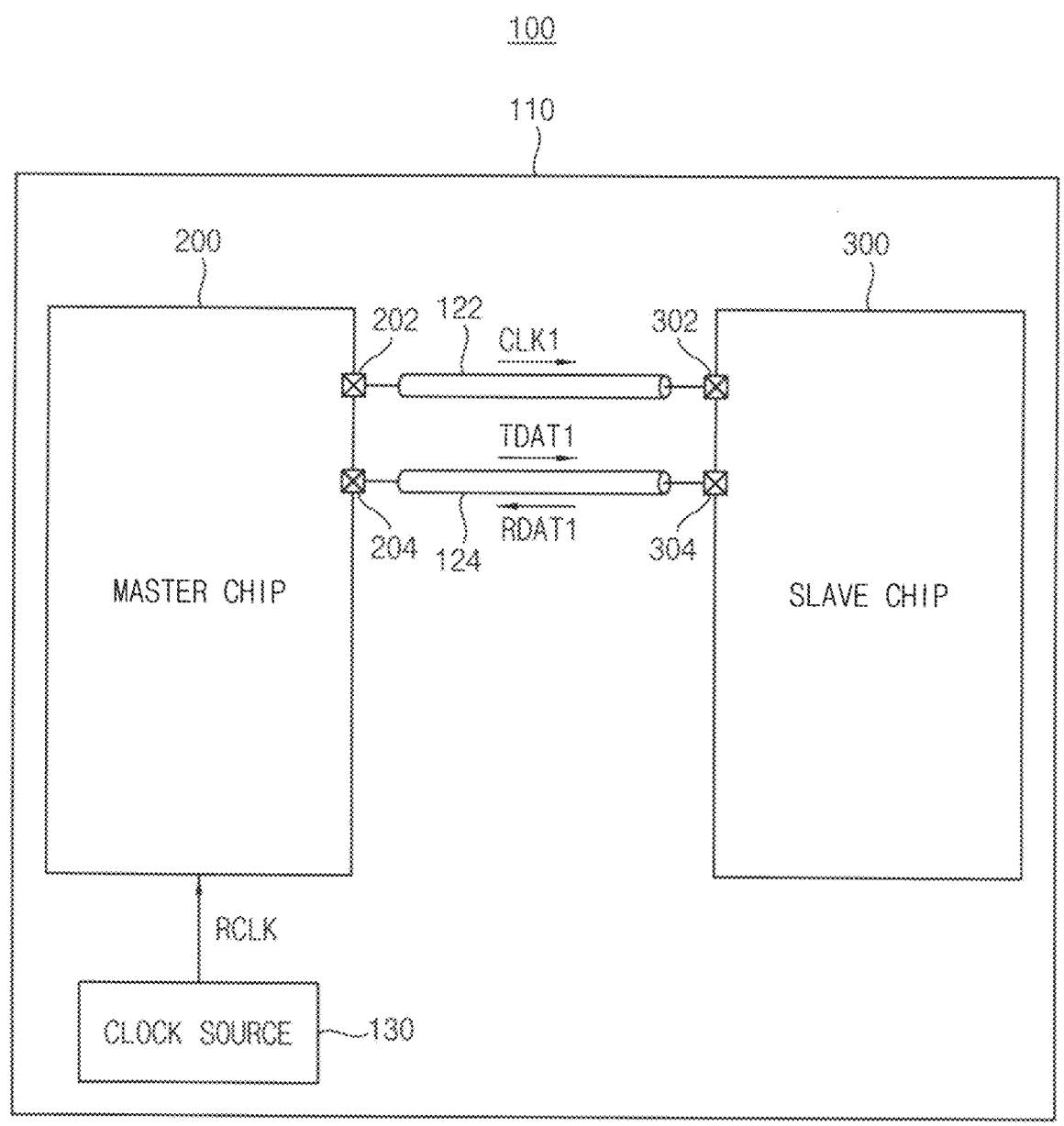

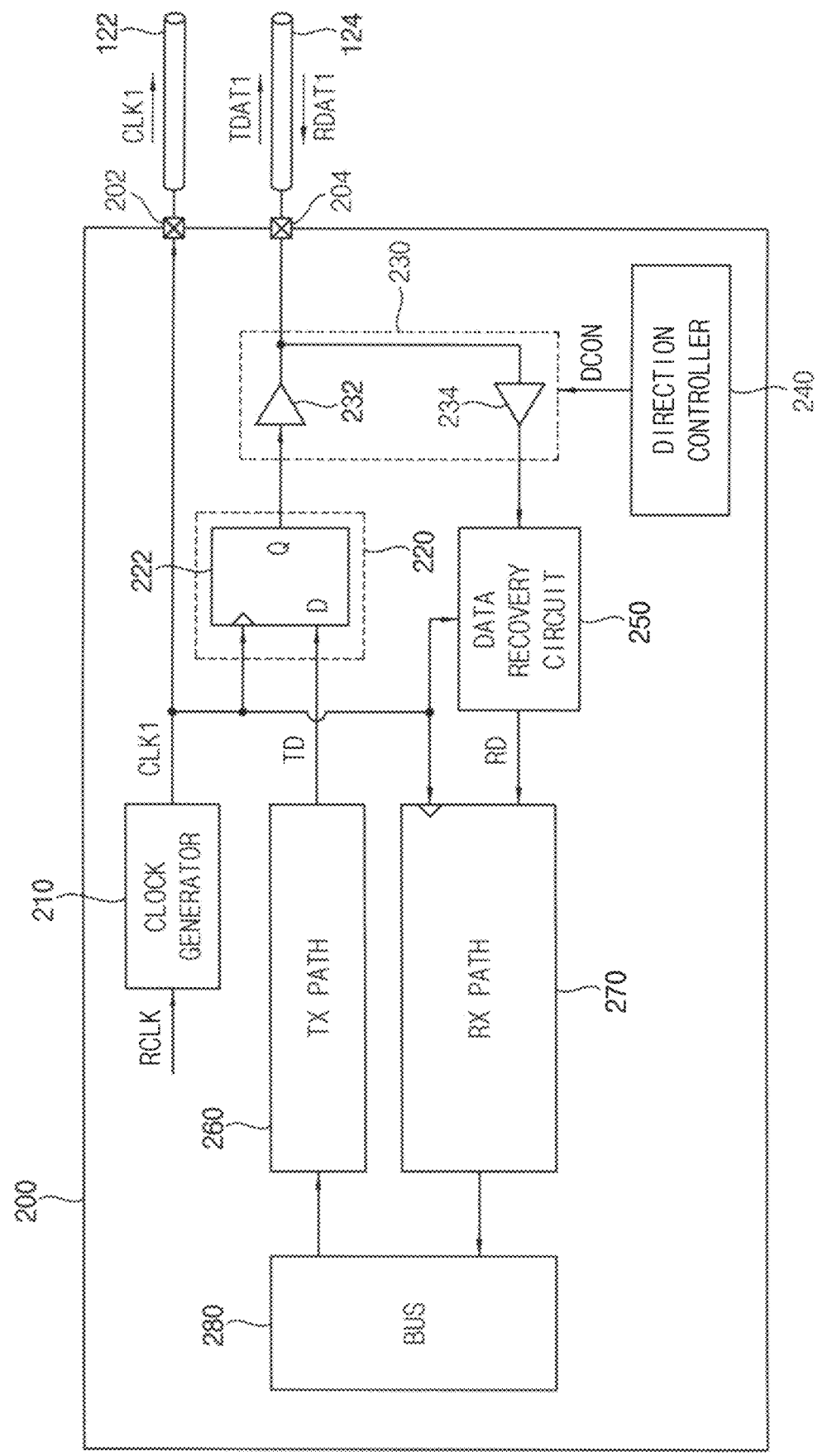

DEVICE INCLUDING DIGITAL INTERFACE WITH MIXTURE OF SYNCHRONOUS AND ASYNCHRONOUS COMMUNICATION, DIGITAL PROCESSING SYSTEM INCLUDING THE SAME, AND DIGITAL PROCESSING METHOD PERFORMED BY THE SAME

CROSS-REFERENCE TO RELATED APPLICATION

This application is a continuation of U.S. patent application Ser. No. 16/165,447, filed on Oct. 19, 2018, which claims priority under 35 USC § 119 to Korean Patent Application No. 10-2017-0179466, filed on Dec. 26, 2017 in the Korean Intellectual Property Office (KIPO), the contents of each of which are herein incorporated by reference in their entirety.

BACKGROUND

1. Technical Field

Example embodiments relate to semiconductor integrated circuits, and more particularly to devices including digital interface with mixture of synchronous and asynchronous communication, digital processing systems including the devices, and/or digital processing methods performed by the devices and the digital processing systems.

2. Description of the Related Art

In telecommunication or computer science, digital interface refers to a process of transmitting digital data through one or more communication channels or computer buses, for example. In addition, many communication systems are designed to connect two or more integrated circuits (ICs) with each other on the same printed circuit board (PCB). To improve performance of the communication system, a training operation and/or a calibration operation can be performed for each device and/or each chip, however, the communication system including circuits for the training operation and/or the calibration operation with regard to two or more ICs may have a relatively complex structure.

SUMMARY

At least one example embodiment of the present disclosure provides a digital processing system including digital interface with mixture of synchronous and asynchronous communication and capable of having relatively simple structure.

At least one example embodiment of the present disclosure provides a master chip including digital interface with mixture of synchronous and asynchronous communication and capable of having relatively simple structure.

At least one example embodiment of the present disclosure provides a digital processing method performed by the digital processing system and/or the master chip.

According to example embodiments, a digital processing system includes a master chip and a first slave chip. The master chip includes a first clock pin and a first data pin. The first slave chip includes a second clock pin and a second data pin. The digital processing system may be configured to perform a first transmission operation, in which first data is transmitted from the master chip to the first slave chip, based on a synchronous scheme, in which a first clock signal output from the master chip via the first clock pin and the first data output from the master chip via the first data pin are provided together and the first data is transmitted in synchronization with the first clock signal, and a first reception operation, in which second data is transmitted from the first slave chip to the master chip, based on an asynchronous scheme, in which the second data output from the first slave chip via the second data pin is transmitted regardless of the first clock signal.

According to example embodiments, a master chip configured to communicate with at least one slave chip includes the master chip having a first clock pin and a first data pin. The first clock pin may be configured to output a first clock signal in a transmission operation, in which first data is transmitted from the master chip to the at least one slave chip. The first data pin may be configured to output the first data in the transmission operation. The master chip is configured to perform a transmission operation based on a synchronous scheme, in which the first clock signal and the first data are provided together and the first data is transmitted in synchronization with the first clock signal, and a reception operation, in which second data is transmitted from the at least one slave chip to the master chip, based on an asynchronous scheme, in which the second data is transmitted regardless of the first clock signal.

According to example embodiments, a digital processing method that is performed between a master chip and a slave chip, the master chip includes a first clock pin and a first data pin, and the slave chip includes a second clock pin and a second data pin, includes performing a transmission operation, in which first data is transmitted from the master chip to the slave chip, based on a synchronous scheme, in which a first clock signal output from the master chip via the first clock pin and the first data output from the master chip via the first data pin are provided together and the first data is transmitted in synchronization with the first clock signal, and performing a reception operation, in which second data is transmitted from the slave chip to the master chip, is performed based on an asynchronous scheme, in which the second data output from the slave chip via the second data pin is transmitted regardless of the first clock signal.

The master chip, the digital processing system and the digital processing method according to example embodiments may include the digital interface with a mixture of synchronous and asynchronous communication. The transmission operation (or the write operation) in which the first data is transmitted from the master chip to the slave chip may be performed based on the synchronous scheme, and thus the first data may be transmitted with relatively high speed. The reception operation (or the read operation) in which the second data is transmitted from the slave chip to the master chip may be performed based on the asynchronous scheme, and thus a time desired to transmit the second data in response to the command from the master chip may be flexibly set, and various types of slave chips may be supported.

Further, when each of the master chip and the slave chip includes one data pin, and a speed of the reception operation is set to be slower than a speed of the transmission operation, the master chip and the slave chip may have a relatively small size, a relatively simple structure and/or a relatively low power consumption without degrading performance.

BRIEF DESCRIPTION

Illustrative, non-limiting example embodiments will be more clearly understood from the following detailed description taken in conjunction with the accompanying drawings.

FIG. 1 is a block diagram illustrating a digital processing system according to an example embodiment.

FIG. 2 is a block diagram illustrating an example of a master chip that is included in the digital processing system of FIG. 1.

DETAILED DESCRIPTION OF THE EMBODIMENTS

Figure 3A:
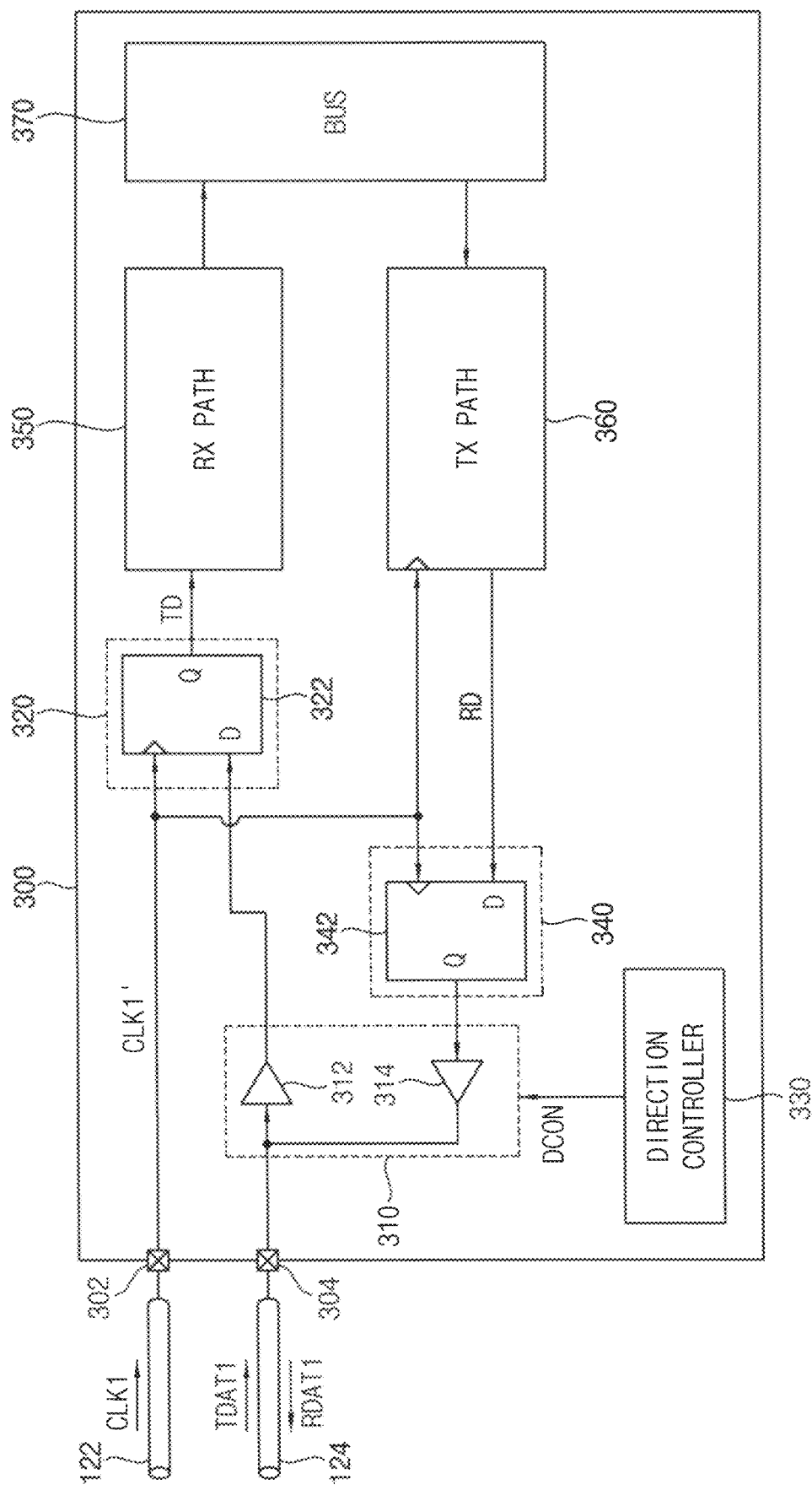
FIGS. 3A and 3B are block diagrams illustrating examples of a slave chip that is included in the digital processing system of FIG. 1.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a digital processing system according to an example embodiment.

Referring to FIG. 1, a digital processing system 100 includes a master chip 200 and a slave chip 300. The digital processing system 100 may further include a clock wire 122, a data wire 124, a clock source 130, and a board 110.

Each of the master chip 200 and the slave chip 300 includes one clock pin and one data pin. For example, the master chip 200 includes a first clock pin 202 and a first data pin 204, and the slave chip 300 includes a second clock pin 302 and a second data pin 304. For example, a pin may be a contact pad or a contact pin, but inventive concepts are not limited thereto.

The clock wire 122 may be a single wire that electrically connects the first clock pin 202 with the second clock pin 302, and the data wire 124 may be a single wire that electrically connects the first data pin 204 with the second data pin 304. The clock wire 122 may represent a unidirectional or bidirectional signal line that can transmit a clock signal. The data wire 124 may represent a bidirectional digital interface that can transmit a digital stream, e.g., a sequence of bits. For example, a single wire may be implemented as an electrical transmission line (e.g., a microstrip manufactured using printed circuit board (PCB) technology), but inventive concepts are not limited thereto.

The digital processing system 100 according to some example embodiments may perform a transmission (TX) operation in which data is provided or transmitted from the master chip 200 to the slave chip 300 and a reception operation (RX) in which data is provided or transmitted from the slave chip 300 to the master chip 200. The transmission operation and the reception operation may be defined with respect to the master chip 200. The transmission operation may be referred to as a write operation or a write communication, and the reception operation may be referred to as a read operation or a read communication.

In some example embodiments, the transmission operation may be performed based on a synchronous scheme, and the reception operation may be performed based on an asynchronous scheme.

In some example embodiments, when or while the transmission operation is performed, a first clock signal CLK1 that is output from the master chip 200 via the first clock pin 202 and first data TDAT1 that is output from the master chip 200 via the first data pin 204 may be provided together. For example, the first data TDAT1 may be transmitted in synchronization with the first clock signal CLK1. An operation of synchronizing the first data TDAT1 with the first clock signal CLK1 may represent that a center and/or a boundary of each bit of the first data TDAT1 are matched with or correspond to a rising edge and/or a falling edge of the first clock signal CLK1.

When or while the reception operation is performed, second data RDAT1 that is output from the slave chip 300 via the second data pin 304 may be transmitted regardless of the first clock signal CLK1. An operation of transmitting the second data RDAT1 regardless of the first clock signal CLK1 may represent that the second data RDAT1 is transmitted without synchronizing with the first clock signal CLK1 (e.g., meaning that a center and/or a boundary of each bit of the second data RDAT1 are not matched with or do not correspond to a rising edge and/or a falling edge of the first clock signal CLK1).

The synchronous scheme and the asynchronous scheme may be determined with respect to the master chip 200. For example, an operation of performing the transmission operation based on the synchronous scheme may represent that the first data TDAT1 output from the master chip 200 is synchronized with the first clock signal CLK1 generated by the master chip 200. An operation of performing the reception operation based on the asynchronous scheme may represent that the second data RDAT1 received by the master chip 200 is not synchronized with the first clock signal CLK1 generated by the master chip 200.

In some example embodiments, the transmission operation and the reception operation may be performed based on the same digital interface. Although the transmission operation and the reception operation are different from each other because the transmission operation is performed based on the synchronous scheme and the reception operation is performed based on the asynchronous scheme, an interface for the transmission operation and an interface for the reception operation may be the same interface based on the same protocol. In other words, the interface for the transmission operation and the interface for the reception operation may be homogeneous interface, not heterogeneous interface.

In an example of FIG. 1, the transmission operation and the reception operation may be performed via a single data wire 124. As described above, the first data pin 204 and the second data pin 304 may be connected to each other by the data wire 124. In the transmission operation, the first data TDAT1 that is output from the master chip 200 via the first data pin 204 may be transmitted to the slave chip 300 via the data wire 124 and the second data pin 304. In the reception operation, the second data RDAT1 that is output from the slave chip 300 via the second data pin 304 may be transmitted to the master chip 200 via the data wire 124 and the first data pin 204. In addition, in the transmission operation, the first clock signal CLK1 that is output from the master chip 200 via the first clock pin 202 may be transmitted to the slave chip 300 via the clock wire 122 and the second clock pin 302. In the reception operation, the first clock signal CLK1 may not be transmitted to any chip in any direction.

As described above, when the transmission operation and the reception operation are performed via a single data wire 124, the number of pins included in the master chip 200 and the slave chip 300 may be reduced. As the number of pins included in the master chip 200 and the slave chip 300 is reduced, a size of the master chip 200 and the slave chip 300 may be reduced, power consumption of the master chip 200 and the slave chip 300 may also be reduced, and manufacturing cost of the master chip 200 and the slave chip 300 may also be reduced.

In other words, the master chip 200 and the slave chip 300 may be formed in a smaller area of a silicon substrate than conventional ones, and thus price competitiveness of the master chip 200 and the slave chip 300 may increase. For example, the master chip 200 and the slave chip 300 may be implemented in an integrated circuit (IC), a system-on-chip (SoC), or a package.

Configurations of the master chip 200 and the slave chip 300 for performing the transmission operation and the reception operation will be described with reference to FIGS. 2, 3A and 3B. The synchronous scheme, the asynchronous scheme, and the same interface associated with the transmission operation and the reception operation will be described with reference to FIG. 4.

In some example embodiments, the master chip 200 may be a controller circuit or a processor which can actively control the slave chip 300. For example, the master chip 200 may be implemented as a baseband modem processor chip, a chip which can function as both a modem and an application processor (AP), or a mobile AP, but inventive concepts are not limited to these examples.

In some example embodiments, the slave chip 300 may be one of various circuits or devices which can passively operate based on a control of the master chip 200. For example, the slave chip 300 may be implemented as a radio frequency IC (RFIC), a connectivity chip, a sensor, a fingerprint recognition chip, a power management IC (PMIC), a power supply module, a digital display interface (DDI) chip, a display driver IC, or a touch screen controller, but inventive concepts are not limited to these examples.

In some example embodiments, the RFIC may include at least one connectivity chip. The connectivity chip may include a chip for mobile communication, a chip for wireless local area network (WLAN), a chip for Bluetooth (BT) communication, a chip for global navigation satellite system (GNSS) communication, a chip for processing a frequency modulation (FM) audio signal/video signal, a chip for near field communication (NFC), and/or a chip for Wi-Fi communication, but inventive concepts are not limited to these examples.

In some example embodiments, the master chip 200 and the slave chip 300 may be mounted on the same board 110. For example, the board 110 may be implemented as a PCB or a flexible PCB (FPCB), but inventive concepts are not limited to these examples. The digital processing system 100 may be a system which can transmit, handle, and process data on a chip level and/or a board level.

In some example embodiments, the digital processing system 100 may be implemented as one of various electronic systems such as a personal computer, a laptop computer, a mobile phone, a smart phone, a tablet computer, a personal digital assistants (PDA), an enterprise digital assistant (EDA), a portable multimedia player (PMP), a digital camera, a music player, a portable game console, a navigation device, a wearable device, an internet of things (IoT) device, an internet of everything (IoE) device, an e-book, a virtual reality (VR) device, or an augmented reality (AR) device.

The clock source 130 may generate a reference clock signal RCLK. The reference clock signal RCLK may be provided to the master chip 200, and the master chip 200 may generate the first clock signal CLK1 based on the reference clock signal RCLK. For example, the clock source 130 may include a ring oscillator, a RC oscillator, a crystal oscillator, or a temperature compensated crystal oscillator (TCXO), but inventive concepts are not limited to these examples.

FIG. 2 is a block diagram illustrating an example of a master chip that is included in the digital processing system of FIG. 1. FIGS. 3A and 3B are block diagrams illustrating examples of a slave chip that is included in the digital processing system of FIG. 1.

Referring to FIGS. 1, 2, 3A and 3B, the master chip 200 includes the first clock pin 202 and the first data pin 204. The master chip 200 may further include a clock generator 210, a transmission synchronization circuit 220, a first input/output (I/O) circuit 230, a first direction controller 240, a data recovery circuit 250, a first transmission path 260, a first reception path 270, and a first bus 280.

The slave chip 300 of FIG. 3A includes the second clock pin 302 and the second data pin 304. The slave chip 300 of FIG. 3A may further include a second I/O circuit 310, a reception circuit 320, a second direction controller 330, a transmission circuit 340, a second reception path 350, a second transmission path 360, and a second bus 370. The slave chip 300 of FIG. 3B may be substantially the same as the slave chip 300 of FIG. 3A, except that the transmission circuit 340 in FIG. 3A is replaced with a transmission circuit 340a in FIG. 3B.

Hereinafter, an operation of elements in the master chip 200 and the slave chip 300 according to an operation of the digital processing system 100 will be described in detail.

Firstly, the transmission operation (or the write operation) in which the first clock signal CLK1 and the first data TDAT1 are transmitted from the master chip 200 to the slave chip 300 will be described in detail.

The clock generator 210 may generate the first clock signal CLK1 based on the reference clock signal RCLK. For example, the clock generator 210 may include a phase locked loop (PLL) circuit or a delay locked loop (DLL) circuit, but inventive concepts are not limited to these examples.

The transmission synchronization circuit 220 may synchronize data TD to be transmitted in the transmission operation with the first clock signal CLK1. For example, the transmission synchronization circuit 220 may include a first flip-flop 222. The first flip-flop 222 may include a clock input terminal receiving the first clock signal CLK1, a data input terminal D receiving the data TD, and a data output terminal Q outputting the first data TDAT1 that is synchronized with the first clock signal CLK1. For example, the first data TDAT1 may be synchronized with each rising edge or each falling edge of the first clock signal CLK1.

The data TD may be provided from a first memory device (not shown) and/or a first data processing device (not shown) that are included in the master chip 200, and may be provided to the transmission synchronization circuit 220 via the first bus 280 and the first transmission path 260.

The first I/O circuit 230 may include a first output driver 232 and a first input buffer 234. In the transmission operation, the first output driver 232 may drive each bit (or each bit value) included in the first data TDAT1 to the first data pin 204.

The first direction controller 240 may enable one of the first output driver 232 and the first input buffer 234, and may disable the other of the first output driver 232 and the first input buffer 234, based on a direction control signal DCON. For example, the direction control signal DCON may be a 1-bit signal. In the transmission operation, a value of the direction control signal DCON may be set to "1." The first direction controller 240 may enable the first output driver 232 to output the first data TDAT1 and may disable the first input buffer 234, based on the direction control signal DCON having the value of "1." For example, the value of "1" may be a logic high level or a logic 1.

Based on above described operation, the master chip 200 may output the first clock signal CLK1 and the first data TDAT1 synchronized with the first clock signal CLK1 together via the first clock pin 202 and the first data pin 204, respectively. The first clock signal CLK1 and the first data TDAT1 may be transmitted to the slave chip 300 via the clock wire 122 and the data wire 124, respectively.

The slave chip 300 may receive the first clock signal CLK1 and the first data TDAT1 via the second clock pin 302 and the second data pin 304, respectively.

The second I/O circuit 310 may include a second input buffer 312 and a second output driver 314. In the transmission operation, the second input buffer 312 may buffer the first data TDAT1, which has been output from the master chip 200 and received via the second data pin 304, and may transmit the buffered first data TDAT1 to the reception circuit 320 bit by bit.

The second direction controller 330 may enable one of the second input buffer 312 and the second output driver 314, and may disable the other of the second input buffer 312 and the second output driver 314, based on the direction control signal DCON. As described above, the value of the direction control signal DCON may be set to "1" in the transmission operation. The second direction controller 330 may enable the second input buffer 312 to receive the first data TDAT1 and may disable the second output driver 314, based on the direction control signal DCON having the value of "1."

The reception circuit 320 may obtain the data TD based on a received first clock signal CLK1' and the received first data TDAT1. For example, the reception circuit 320 may include a second flip-flop 322. The second flip-flop 322 may include a clock input terminal receiving the first clock signal CLK1', a data input terminal D receiving the first data TDAT1, and a data output terminal Q outputting the data TD.

The data TD may be provided to a second memory device (not shown) and/or a second data processing device (not shown) that are included in the slave chip 300 via the second reception path 350 and the second bus 370.

In short, the first transmission path 260, the transmission synchronization circuit 220 and the first output driver 232 in the master chip 200 may be enabled in the transmission operation, and the second input buffer 312, the reception circuit 320 and the second reception path 350 in the slave chip 300 may be enabled in the transmission operation.

Next, the reception operation (or the read operation) in which the second data RDAT1 is transmitted from the slave chip 300 to the master chip 200 will be described in detail.

The transmission circuit 340 or 340a may set a transmission speed (or a data rate) of data RD to be transmitted in the reception operation based on the first clock signal CLK1' received in the transmission operation. For example, the transmission circuit 340 in FIG. 3A may include a third flip-flop 342. The third flip-flop 342 may include a clock input terminal receiving the first clock signal CLK1', a data input terminal D receiving the data RD, and a data output terminal Q outputting the second data RDAT1. For another example, the transmission circuit 340a in FIG. 3B may include a third flip-flop 342a and a clock divider (DIV) 344a. The clock divider 344a may divide the first clock signal CLK1' by N to generate the divided clock signal, where N is a natural number greater than or equal to two. The third flip-flop 342a may include a clock input terminal receiving the divided clock signal, a data input terminal D receiving the data RD, and a data output terminal Q outputting the second data RDAT1.

In some example embodiments, the transmission circuit 340 or 340a may set a transmission speed (or a data rate) of the second data RDAT1 such that the transmission speed of the second data RDAT1 is slower than that of the first data TDAT1. In an example of FIG. 3A, to set the transmission speed of the second data RDAT1 slower than that of the first data TDAT1, the second data RDAT1 may be synchronized with some rising edges or some falling edges of the first clock signal CLK1'. In an example of FIG. 3B, to set the transmission speed of the second data RDAT1 slower than that of the first data TDAT1, the second data RDAT1 may be synchronized with each rising edge or each falling edge of the divided clock signal.

The data RD may be provided from the second memory device and/or the second data processing device that are included in the slave chip 300, and may be provided to the transmission circuit 340 or 340a via the second bus 370 and the second transmission path 360. The second transmission path 360 may also operate based on the first clock signal CLK1'.

In the reception operation, the second output driver 314 included in the second I/O circuit 310 may drive each bit (or each bit value) included in the second data RDAT1 to the second data pin 304. In the reception operation, the value of the direction control signal DCON may be set to "0." The second direction controller 330 may enable the second output driver 314 to output the second data RDAT1 and may disable the second input buffer 312, based on the direction control signal DCON having the value of "0." For example, the value of "0" may be a logic low level or a logic 0.

Based on above described operation, the slave chip 300 may output the second data RDAT1 via the second data pin 304. The second data RDAT1 may be transmitted to the master chip 200 via the data wire 124. The second data RDAT1 may be transmitted regardless of the first clock signal CLK1 (e.g., without synchronizing with the first clock signal CLK1), and thus the second clock pin 302 and the clock wire 122 may not transmit the first clock signal CLK1 in the reception operation.

In some example embodiments, the transmission circuit 340 or 340a and the second transmission path 360 may operate based on the first clock signal CLK1' received in the transmission operation, as described above. In other words, the slave chip 300 may operate based on the first clock signal CLK1' received from the master chip 200 via the second clock pin 302, not based on a clock signal generated by the slave chip 300. Thus, the slave chip 300 may not include a clock generator, and may have relatively small size and lower power consumption.

The master chip 200 may receive the second data RDAT1 via the first data pin 204.

In the reception operation, the first input buffer 234 included in the first I/O circuit 230 may buffer the second data RDAT1, which has been output from the slave chip 300 and received via the first data pin 204, and may transmit the buffered second data RDAT1 to the data recovery circuit 250 bit by bit. In the reception operation, the value of the direction control signal DCON may be set to "0." The first direction controller 240 may enable the first input buffer 234 to receive the second data RDAT1 and may disable the first output driver 232, based on the direction control signal DCON having the value of "0."

The data recovery circuit 250 may obtain the data RD by sampling the second data RDAT1 based on the first clock signal CLK1. For example, the data recovery circuit 250 may sample the second data RDAT1 using the first clock signal CLK1 as an oversampling clock signal.

The data RD may be provided to the first memory device and/or the first data processing device that are included in the master chip 200 via the first reception path 270 and the first bus 280. The first reception path 270 may also operate based on the first clock signal CLK1.

As described above, because the clock signal is not transmitted from the slave chip 300 in the reception operation, the data recovery circuit 250 and the first reception path 270 may operate based on the first clock signal CLK1 that is generated by the clock generator 210.

Thus, the second transmission path 360, the transmission circuit 340 or 340a and the second output driver 314 in the slave chip 300 may be enabled in the reception operation, and the first input buffer 234, the data recovery circuit 250, and the first reception path 270 in the master chip 200 may be enabled in the reception operation.

Figure 4:
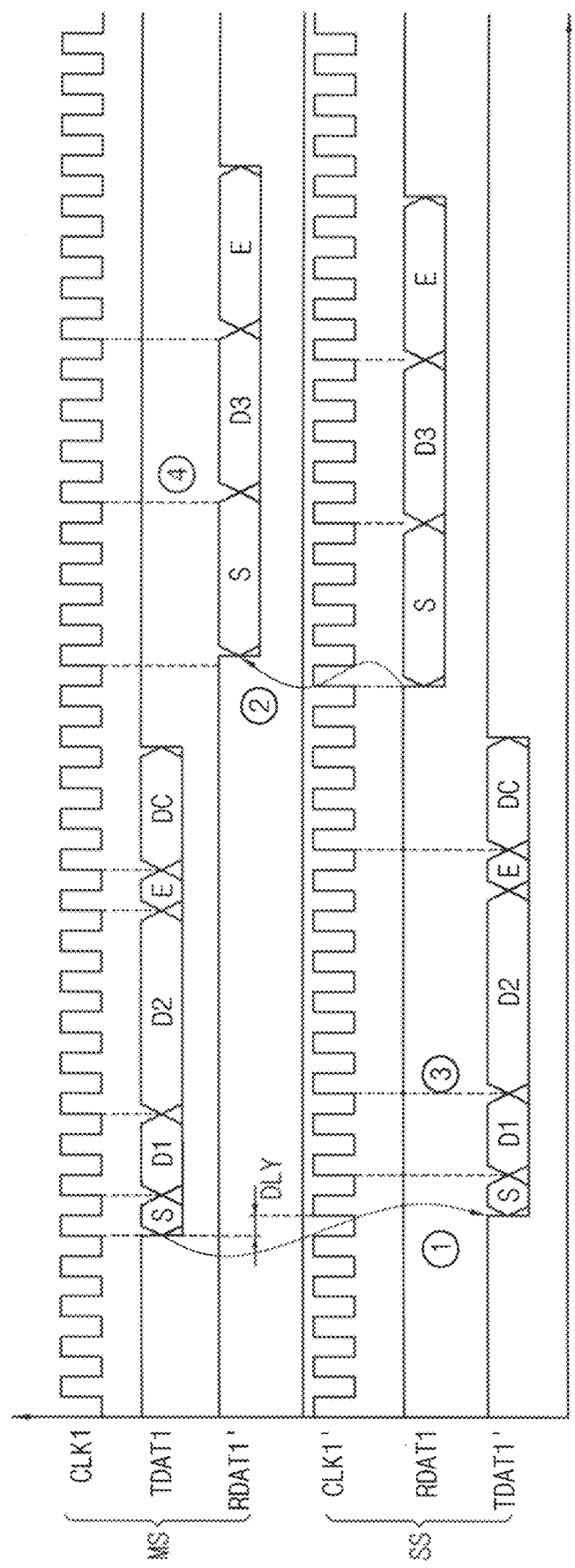
FIG. 4 is a timing diagram for describing an operation of the digital processing system of FIG. 1.

FIG. 4 is a timing diagram for describing an operation of the digital processing system of FIG. 1.

In FIG. 4, MS represents signals in the master chip 200, and SS represents signals in the slave chip 300. CLK1 represents a waveform of the first clock signal that is generated by the clock generator 210 in the master chip 200, and CLK1' represents a waveform of the first clock signal that is received by the slave chip 300 in the transmission operation. TDAT1 represents a waveform of the first data that is output from the master chip 200 in the transmission operation, and TDAT1' represents a waveform of the first data that is received by the slave chip 300 in the transmission operation. RDAT1 represents a waveform of the second data that is output from the slave chip 300 in the reception operation, and RDAT1' represents a waveform of the second data that is received by the master chip 200 in the reception operation.

In addition, in FIG. 4, "S" included in each data is a start pattern that represents a start of data transmission, "E" included in each data is a stop pattern that represents a stop of data transmission, each of "D1", "D2" and "D3" represents information in each data, and "DC" represents a direction change for data transmission.

Referring to FIGS. 1, 2, 3A, 3B and 4, in the transmission operation, the master chip 200 outputs the first clock signal CLK1 and the first data TDAT1 together, and transmits the first data TDAT1 in synchronization with the first clock signal CLK1 (e.g., transmits the first data TDAT1 based on the synchronous scheme). For example, the first data TDAT1 output from the master chip 200 may be synchronized with each rising edge of the first clock signal CLK1, as illustrated in FIG. 4.

In the transmission operation, the slave chip 300 receives the first clock signal CLK1' and the first data TDAT1' together. Due to a delay by the clock wire 122, a phase of the first clock signal CLK1' received by the slave chip 300 may lag a phase of the first clock signal CLK1 output from the master chip 200 by a delay time DLY. Similarly (e.g., due to a delay by the data wire 124), a phase of the first data TDAT1' received by the slave chip 300 may also lag a phase of the first data TDAT1 output from the master chip 200 by the delay time DLY (e.g., ① in FIG. 4).

A length of the clock wire 122 and a length of the data wire 124 may be substantially the same as each other, or a difference between the length of the clock wire 122 and the length of the data wire 124 may be negligible. Thus, a delay of the first clock signal CLK1' received by the slave chip 300 may be substantially the same as a delay of the first data TDAT1' received by the slave chip 300. As with a relationship between the first clock signal CLK1 and the first data TDAT1 that are output from the master chip 200, the first data TDAT1' received by the slave chip 300 may be synchronized with each rising edge of the first clock signal CLK1' received by the slave chip 300 (e.g., ③ in FIG. 4). Thus, the slave chip 300 may receive and recover the first data TDAT1' based on the first clock signal CLK1' without using a relatively complex circuit (e.g., a clock recovery circuit).

The information D1 and D2 in the first data TDAT1' that is transmitted from the master chip 200 to slave chip 300 may include a command as well as real data. If only the real data is transmitted from the master chip 200 to slave chip 300, the slave chip 300 may just operate based on the received data. If the command is transmitted from the master chip 200 to slave chip 300, the slave chip 300 may operate based on the received command and may be required to transmit data (e.g., a result of an operation by the received command) to the master chip 200. Thus, when at least one of the information D1 and D2 includes a command, the direction change DC for data transmission may be performed for transmitting the second data RDAT1 from the slave chip 300 to the master chip 200 after the first data TDAT1 has been transmitted from the master chip 200 to slave chip 300.

In the reception operation, the slave chip 300 outputs (e.g., transmits) the second data RDAT1 regardless of the first clock signal CLK1 (e.g., transmits the second data RDAT1 based on the asynchronous scheme). For example, the second data RDAT1' received by the master chip 200 may not be synchronized with each rising edge or each falling edge of the first clock signal CLK1 generated in the master chip 200 (e.g., ④ in FIG. 4), as illustrated in FIG. 4. Due to a delay by the data wire 124, a phase of the second data RDAT1' received by the master chip 200 may lag a phase of the second data RDAT1 output from the slave chip 300 by a delay time (e.g., ② in FIG. 4).

As described with reference to FIG. 1, the asynchronous scheme may be determined with respect to the master chip 200. With respect to the slave chip 300, the slave chip 300 may use the first clock signal CLK1' for outputting the second data RDAT1, and thus the second data RDAT1 output from the slave chip 300 may be synchronized with the first clock signal CLK1' used in the slave chip 300.

In some example embodiments, a first transmission speed of the first data TDAT1 in the transmission operation may be different from a second transmission speed of the second data RDAT1 in the reception operation. For example, the second transmission speed may be slower than the first transmission speed.

As described above, since the second data RDAT1' received by the master chip 200 may not be synchronized with the first clock signal CLK1 generated in the master chip 200, the master chip 200 should include a relatively complex circuit (e.g., the data recovery circuit 250 in FIG. 2) for receiving and recovering the second data RDAT1'. Designing the data recovery circuit may be difficult as a transmission speed (or a data rate) increases, and thus the second transmission speed may be set to be slower than the first transmission speed for simplifying a structure of the data recovery circuit. Further, it may be more often a case that the master chip 200 controls the slave chip 300 and transmits data to the slave chip 300 at a relatively high speed and in real-time, and the slave chip 300 transmits data to the master chip 200 at relatively low speed and without real-time, In such case, the second transmission speed may be set to be slower than the first transmission speed.

For example, FIG. 4 illustrates an example where the second transmission speed is a quarter of the first transmission speed, e.g., the first transmission speed is four times faster than the second transmission speed. In the transmission operation, the first data TDAT1 may be synchronized with each rising edge of the first clock signal CLK1, and a length of one bit in the first data TDAT1 may correspond to one period of the first clock signal CLK1. In the reception operation in an example of FIG. 3A, the second data RDAT1 may be synchronized with 4*N-th numbered rising edges of the first clock signal CLK1', and a length of one bit in the second data RDAT1 may correspond to four periods of the first clock signal CLK1'. In the reception operation in an example of FIG. 3B, the divided clock signal may be generated by dividing the first clock signal CLK1' by four, and the second data RDAT1 may be synchronized with each rising edge of the divided clock signal.

In some example embodiments, each of the start pattern S and the stop pattern E may be data having one or more bits. For example, when the start pattern S is transitioned from "1" to "0," it may represent that transmission of data (e.g., the first data TDAT1 or the second data RDAT1) begins. For example, when the stop pattern E is "1," or when the stop pattern E is maintained "1," it may represent that the transmission of data is stopped. For example, a value of a bit immediately before the stop pattern E may be "0" or "1."

In some example embodiments, although not illustrated in FIG. 4, when the second transmission speed is set to a quarter of the first transmission speed, the data recovery circuit 250 in the master chip 200 may sample the second data RDAT1' using the first clock signal CLK1 as a 4× oversampling clock signal. For example, the second data RDAT1' may be sampled by performing a synchronization process for selecting one of a plurality of clock phases of the oversampling clock signal and by performing a sampling process for sampling each bit value included in the second data RDAT1' using a clock phase at the same position as the clock phase selected during the synchronization process. For example, the second data RDAT1' may be sampled by generating a plurality of clock phase selection signals associated with the selected clock phase in each period of the oversampling clock signal using at least two flip-flops, and by sampling each bit value included in the second data RDAT1' in each period of the oversampling clock signal using a clock phase associated with the plurality of clock phase selection signals.

Although FIG. 4 illustrates an example where the second transmission speed is set to a quarter of the first transmission speed, inventive concepts are not limited to these examples. For example, the second transmission speed may be set to a half of the first transmission speed, one eighth of the first transmission speed, etc., and the data recovery circuit 250 may sample the second data RDAT1' using the first clock signal CLK1 as a 2× oversampling clock signal, a 8× oversampling clock signal, etc.

As described above, the transmission operation may be performed based on the synchronous scheme in which the first data TDAT1 is transmitted in synchronization with the first clock signal CLK1, the reception operation may be performed based on the asynchronous scheme in which the second data RDAT1' is transmitted regardless of the first clock signal CLK1, and both the transmission operation and the reception operation may be performed based on the same interface with the same protocol. For example, the first data TDAT1 and the second data RDAT1 may be generated, transmitted and recovered based on the same interface with the same protocol in which each of the information D1, D2 and D3 is arranged between the start pattern S and the stop pattern E.

The master chip 200 and the digital processing system 100 including the master chip 200 according to example embodiments may include the digital interface with mixture of synchronous and asynchronous communication. The transmission operation (or the write operation) in which the first data TDAT1 is transmitted from the master chip 200 to the slave chip 300 may be performed based on the synchronous scheme, and thus the first data TDAT1 may be transmitted with relatively high speed. The reception operation (or the read operation) in which the second data RDAT1 is transmitted from the slave chip 300 to the master chip 200 may be performed based on the asynchronous scheme, and thus a time to transmit the second data RDAT1 in response to the command from the master chip 200 may be flexibly set, and various types of slave chips may be supported.

Further, when the master chip 200 and the slave chip 300 includes one data pin 204 and one data pin 304, respectively, and a speed of the reception operation is set to be slower than a speed of the transmission operation, the master chip 200 and the slave chip 300 may have relatively small size, simple structure and low power consumption without degrading performance.

However, inventive concepts are not limited to these examples where each chip includes one data pin. For example, a chip according to some example embodiments of the inventive concepts may include two or more data pins, and the transmission operation and the reception operation may be performed using the same data wire.

Figure 5:
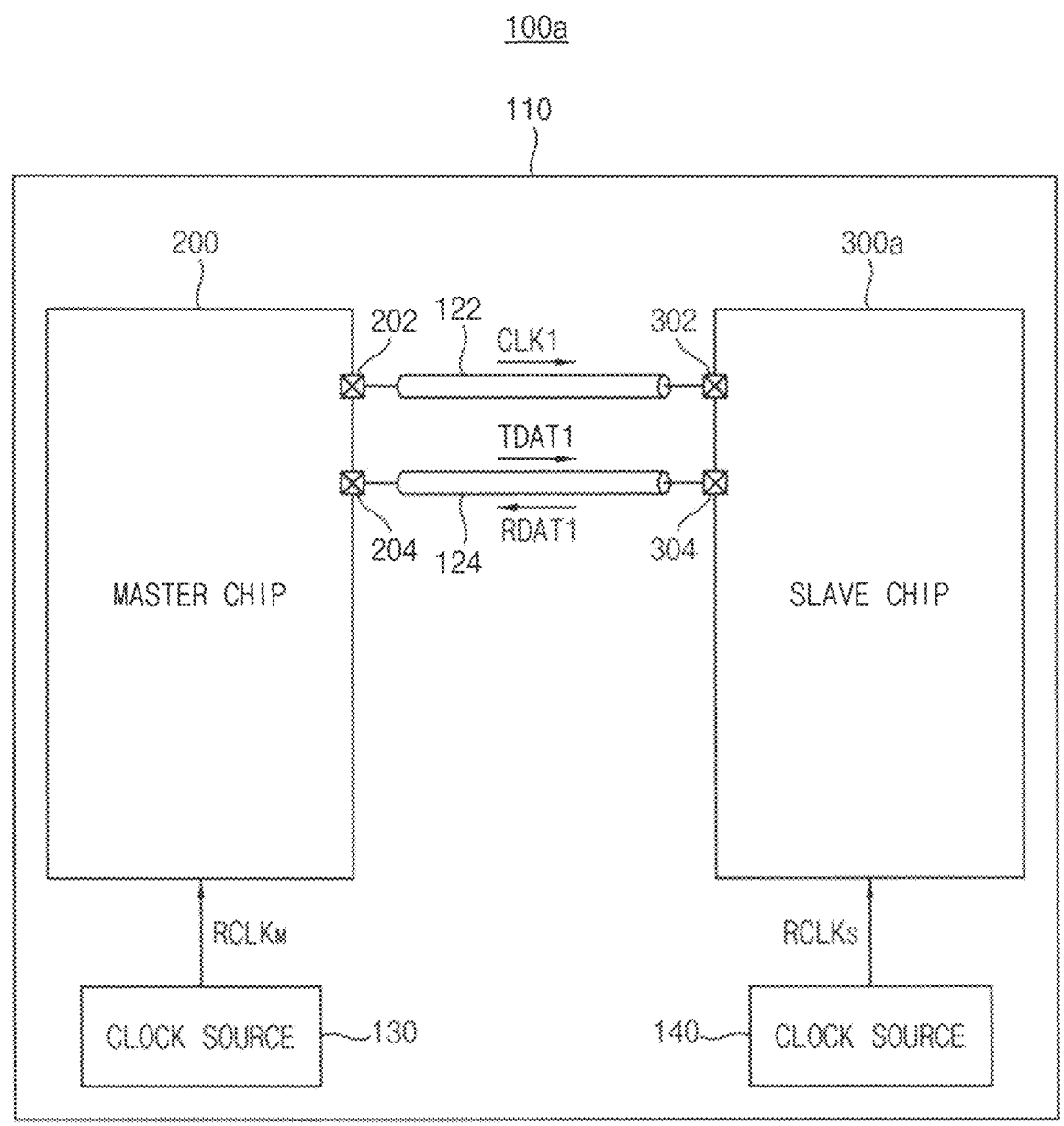
FIGS. 5, 6 and 7 are block diagrams illustrating a digital processing system according to some example embodiments.
Figure 6:
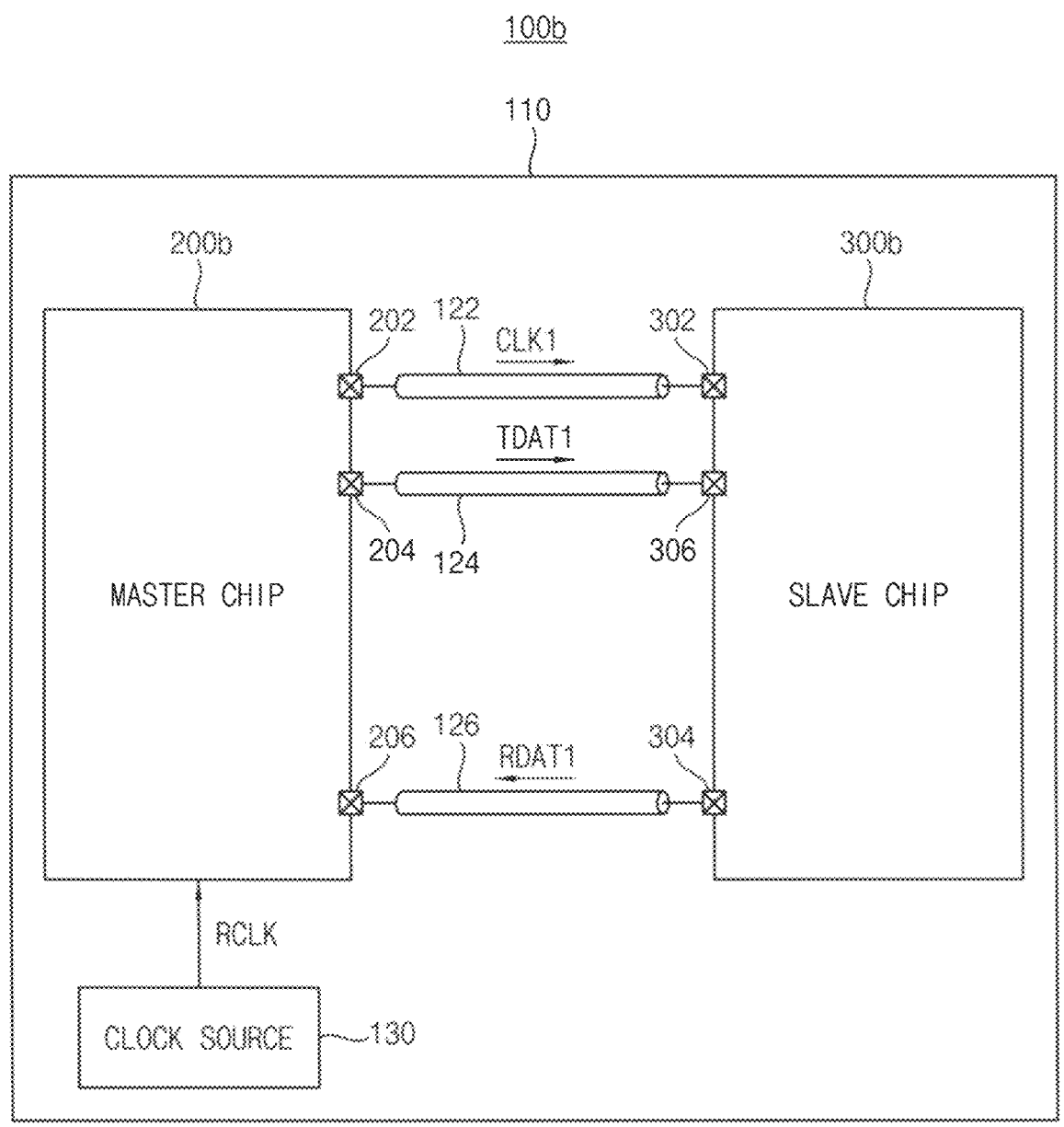
Figure 7:
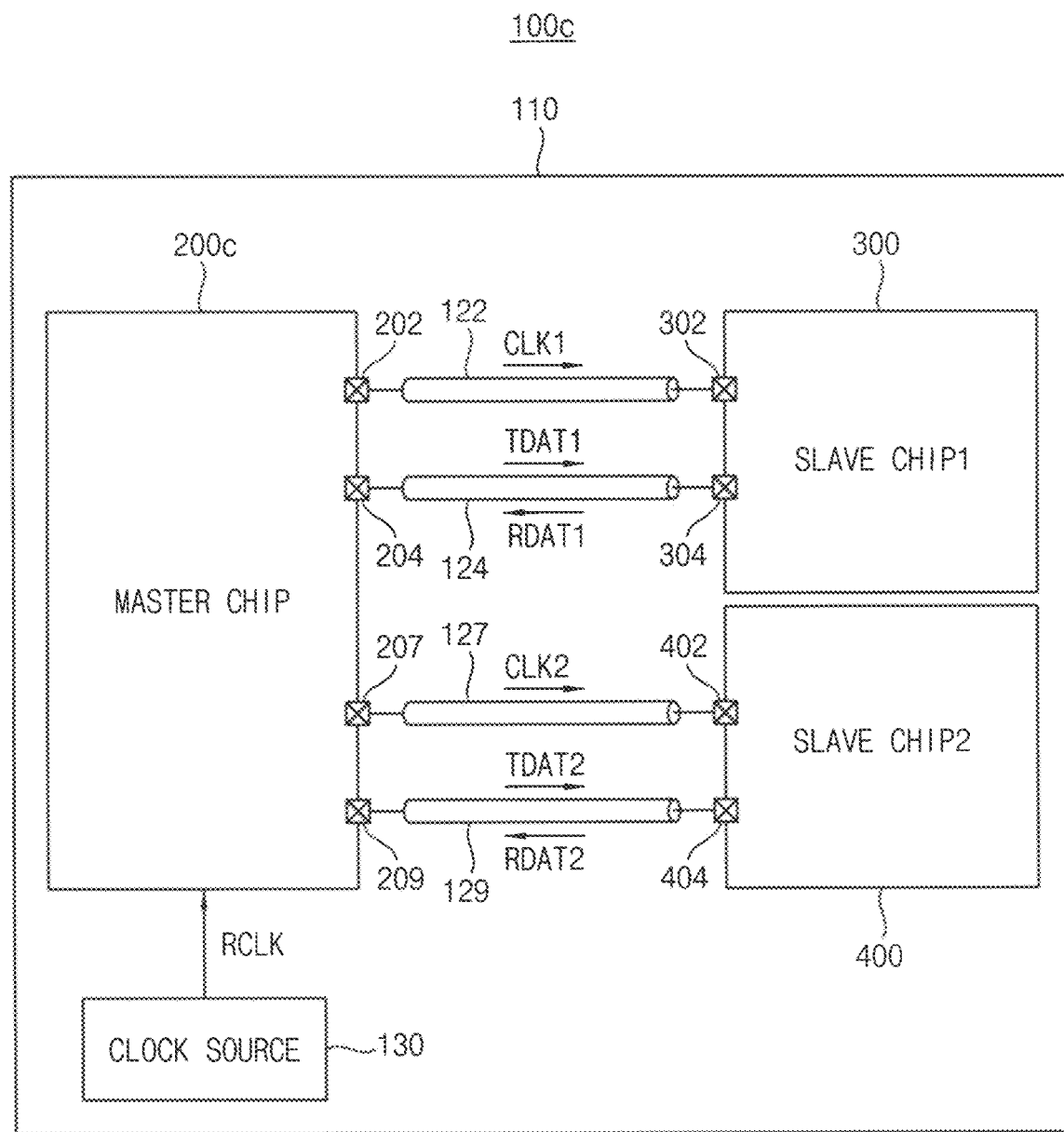

FIGS. 5, 6 and 7 are block diagrams illustrating a digital processing system according to some example embodiments.

Referring to FIG. 5, a digital processing system 100a includes a master chip 200 and a slave chip 300a. The digital processing system 100a may further include a clock wire 122, a data wire 124, a first clock source 130, a second clock source 140, and a board 110.

The digital processing system 100a of FIG. 5 may be substantially the same as the digital processing system 100 of FIG. 1, except that the digital processing system 100a further includes the second clock source 140 and a structure of the slave chip 300a is partially modified. The first clock source 130 in FIG. 5 may correspond to the clock source 130 in FIG. 1. Thus, repeated explanation will be omitted.

As with the first clock source 130, the second clock source 140 may generate the reference clock signal $RCLK_S$. The reference clock signal $RCLK_M$ generated from the first clock source 130 may be referred to as a master clock signal, and the reference clock signal $RCLK_S$ generated from the second clock source 140 may be referred to as a slave clock signal. As illustrated in FIG. 5, the clock source 130 for the master clock signal and the clock source 140 for the slave clock signal may be separated from each other, however, a frequency of the master clock signal and a frequency of the slave clock signal may be substantially the same as each other.

The reference clock signal $RCLK_S$ generated from the second clock source 140 may be provided to the slave chip 300a, and the slave chip 300a may generate a second clock signal based on the reference clock signal $RCLK_S$. For example, unlike examples of FIGS. 3A and 3B, the slave chip 300a may further include a second clock generator that generates the second clock signal based on the reference clock signal $RCLK_S$. Although not illustrated in FIG. 5, the slave chip 300a may operate based on the second clock signal, and the transmission circuit 340 or 340a and the second reception path 350 may receive the second clock signal to operate based on the second clock signal, not the first clock signal CLK1'.

In some example embodiments, a frequency of the second clock signal may be substantially the same as or different from a frequency of the first clock signal CLK1.

Referring to FIG. 6, a digital processing system 100b includes a master chip 200b and a slave chip 300b. The digital processing system 100b may further include a clock wire 122, a first data wire 124, a second data wire 126, a clock source 130, and a board 110.

The digital processing system 100b of FIG. 6 may be substantially the same as the digital processing system 100 of FIG. 1, except that the digital processing system 100b further includes the second data wire 126 and structures of the master chip 200b and the slave chip 300b are partially modified. The first data wire 124 in FIG. 6 may correspond to the data wire 124 in FIG. 1. Thus, repeated explanation will be omitted.

Each of the master chip 200b and the slave chip 300b includes one clock pin and two data pins. For example, the master chip 200b includes a first clock pin 202 and a first data pin 204, and the slave chip 300b includes a second clock pin 302 and a second data pin 304. The slave chip 300b may further include a third data pin 306, and the master chip 200b may further include a fourth data pin 206. The first data wire 124 may be a single wire that electrically connects the first data pin 204 with the third data pin 306, and the second data wire 126 may be a single wire that electrically connects the second data pin 304 with the fourth data pin 206.

In an example of FIG. 6, the transmission operation and the reception operation may be performed via different data wires 124 and 126. In the transmission operation, the first data TDAT1 output from the master chip 200b via the first data pin 204 may be transmitted to the slave chip 300b via the first data wire 124 and the third data pin 306. In the reception operation, the second data RDAT1 output from the slave chip 300b via the second data pin 304 may be transmitted to the master chip 200b via the second data wire 126 and the fourth data pin 206.

Unlike the master chip 200 in FIG. 2, the first input buffer 234 included in the master chip 200b may be connected to the fourth data pin 206, not the first data pin 204. In this example, although not illustrated in FIG. 6, the first direction controller 240 may be omitted.

Figure 3B:
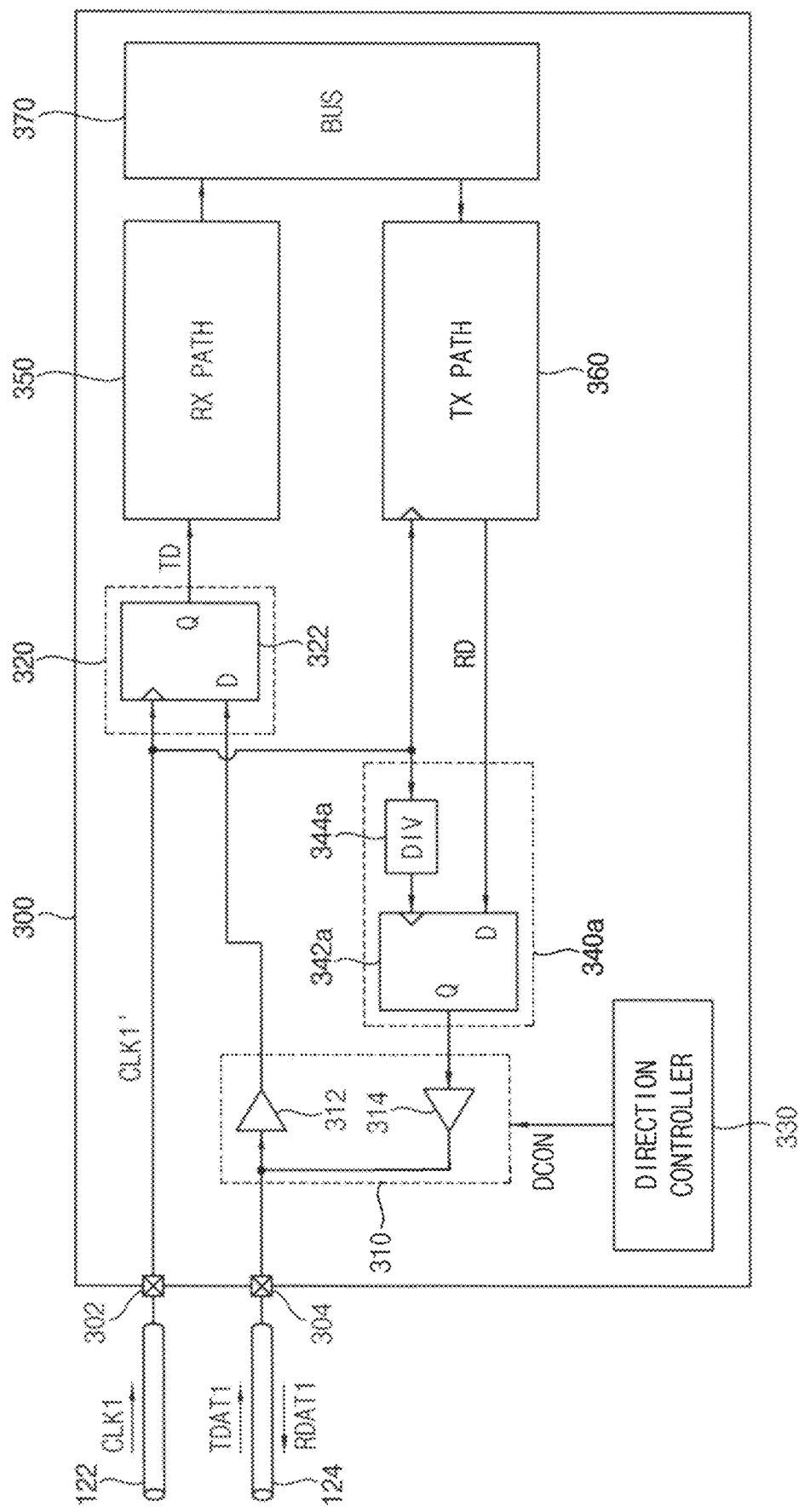

Unlike the slave chip 300 in FIGS. 3A and 3B, the second input buffer 312 included in the slave chip 300b may be connected to the third data pin 306, not the second data pin 304. In this example, although not illustrated in FIG. 6, the second direction controller 330 may be omitted.

Referring to FIG. 7, a digital processing system 100c includes a master chip 200c and a first slave chip 300. The digital processing system 100c may further include a second slave chip 400, a first clock wire 122, a first data wire 124, a second clock wire 127, a second data wire 129, a clock source 130, and a board 110.

The digital processing system 100c of FIG. 7 may be substantially the same as the digital processing system 100 of FIG. 1, except that the digital processing system 100c further includes the second slave chip 400, the second clock wire 127 and the second data wire 129 and a structure of the master chip 200c is partially modified. The first slave chip 300, the first clock wire 122 and the first data wire 124 in FIG. 7 may correspond to the slave chip 300, the clock wire 122, and the data wire 124 in FIG. 1, respectively. Thus, repeated explanation will be omitted.

The master chip 200c includes a first clock pin 202 and a first data pin 204, and may further include a third clock pin 207 and a third data pin 209. The second slave chip 400 may include a fourth clock pin 402 and a fourth data pin 404. The second clock wire 127 may be a single wire that electrically connects the third clock pin 207 with the fourth clock pin 402, and the second data wire 129 may be a single wire that electrically connects the third data pin 209 with the fourth data pin 404.

A second transmission operation in which third data TDAT2 is transmitted from the master chip 200c to the second slave chip 400 may be performed based on the synchronous scheme in which a second clock signal CLK2 output from the master chip 200c via the third clock pin 207 and the third data TDAT2 output from the master chip 200c via the third data pin 209 are provided together and the third data TDAT2 is transmitted in synchronization with the second clock signal CLK2. A second reception operation in which fourth data RDAT2 is transmitted from the second slave chip 400 to the master chip 200c may be performed based on the asynchronous scheme in which the fourth data RDAT2 output from the second slave chip 400 via the fourth data pin 404 is transmitted regardless of the second clock signal CLK2.

As with the master chip 200 of FIG. 2, the master chip 200c may include the clock generator 210, the transmission synchronization circuit 220, the first I/O circuit 230, the first direction controller 240, the data recovery circuit 250, the first transmission path 260 and the first reception path 270 for communicating with the first slave chip 300. Further, the master chip 200c may further include a clock generator, a transmission synchronization circuit, an I/O circuit, a direction controller, a data recovery circuit, a transmission path and a reception path for communicating with the second slave chip 400. A structure of the second slave chip 400 may be substantially the same as the slave chip 300 of FIGS. 3A and 3B.

Although not illustrated in FIGS. 5 and 6, the digital processing system according to some example embodiments may be implemented with both a structure of FIG. 5 in which each chip has an independent clock source and a structure of FIG. 6 in which a data pin for the transmission operation and a data pin for the reception operation are separated from each other.

Although FIG. 7 illustrates an example where the digital processing system includes one master chip 200c and two slave chips 300 and 400, inventive concepts are not limited thereto. For example, the digital processing system may include one master chip and a plurality of slave chips, and may be implemented with at least one of the structure of FIG. 5 and the structure of FIG. 6.

Figure 8:
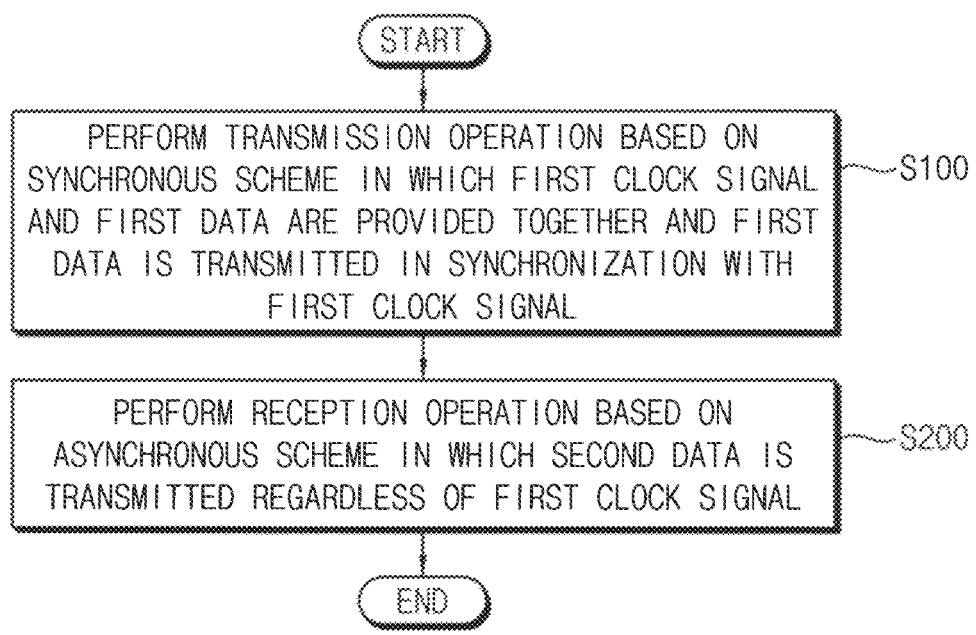
FIG. 8 is a flow chart illustrating a digital processing method according to an example embodiment.

FIG. 8 is a flow chart illustrating a digital processing method according to an example embodiment.

Referring to FIGS. 1 and 8, a digital processing method according to some example embodiments is performed between the master chip 200 and the slave chip 300. The master chip includes the first clock pin 202 and the first data pin 204, and the slave chip 300 includes the second clock pin 302 and the second data pin 304.

In the digital processing method according to some example embodiments, the transmission operation in which the first data TDAT1 is transmitted from the master chip 200 to the slave chip 300 is performed based on the synchronous scheme in which the first clock signal CLK1 output from the master chip 200 via the first clock pin 202 and the first data TDAT1 output from the master chip 200 via the first data pin 204 are provided together and the first data TDAT1 is transmitted in synchronization with the first clock signal CLK1 (step S100).

The reception operation in which the second data RDAT1 is transmitted from the slave chip 300 to the master chip 200 is performed based on the asynchronous scheme in which the second data RDAT1 output from the slave chip 300 via the second data pin 304 is transmitted regardless of the first clock signal CLK1 (step S200). The reception operation may be performed in response to a command of the master chip 200 that is transmitted to the slave chip 300 in the transmission operation.

Figure 9:
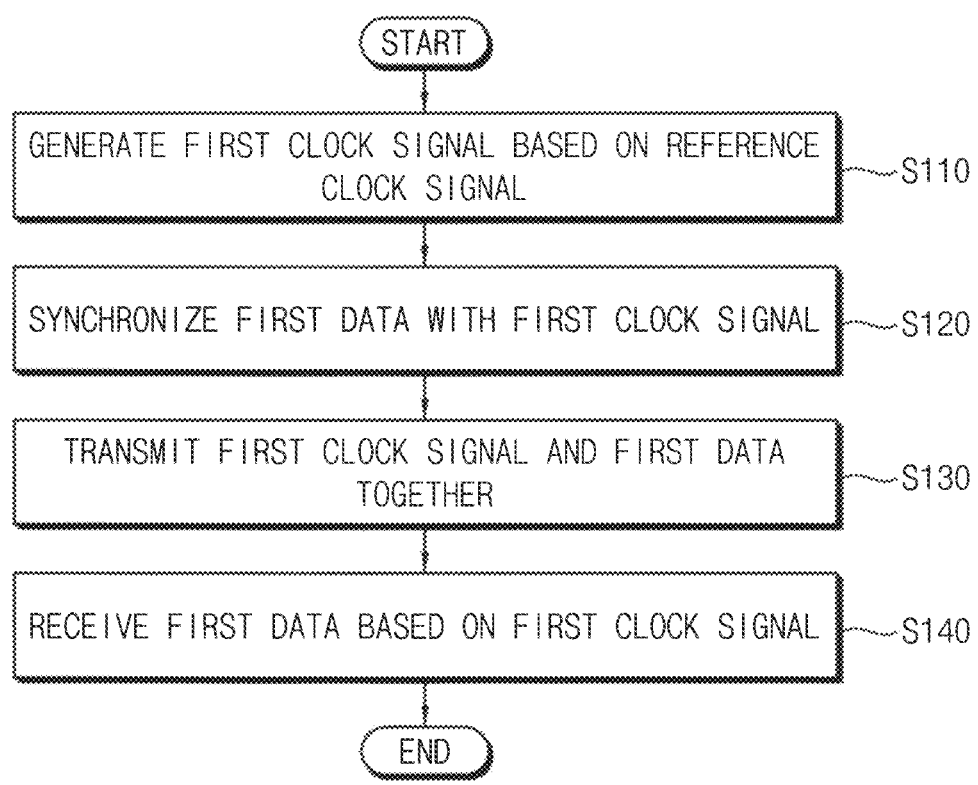
FIG. 9 is a flow chart illustrating an example of performing a transmission operation in FIG. 8.
Figure 10:
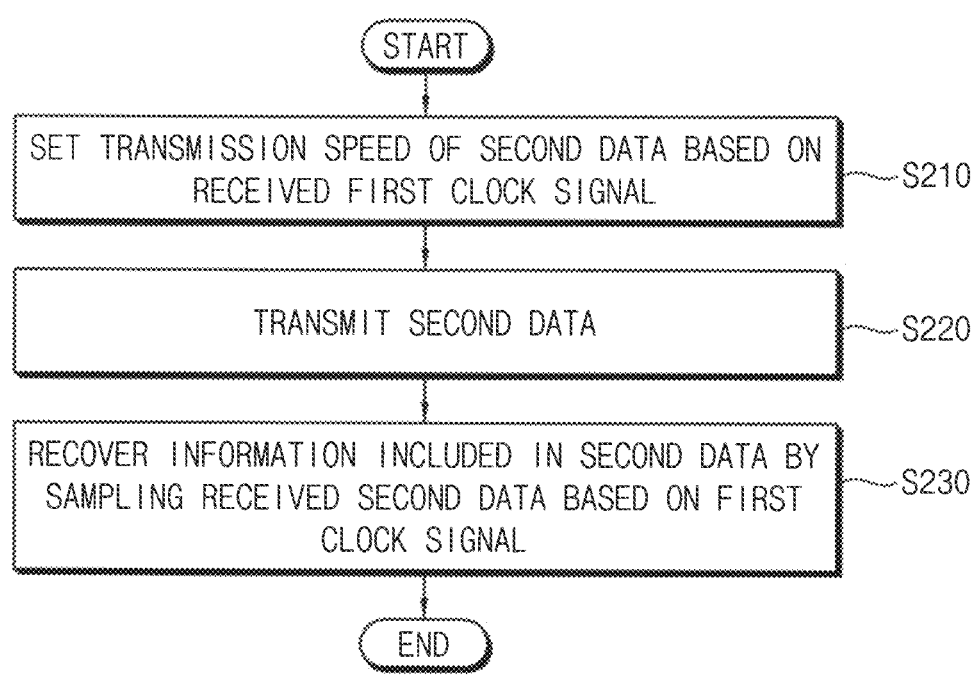
FIG. 10 is a flow chart illustrating an example of performing a reception operation in FIG. 8.

FIG. 9 is a flow chart illustrating an example of performing a transmission operation in FIG. 8. FIG. 10 is a flow chart illustrating an example of performing a reception operation in FIG. 8.

Referring to FIGS. 2, 3A, 3B, 4, 8 and 9, in performing the transmission operation (e.g., in step S100), the clock generator 210 included in the master chip 200 may generate the first clock signal CLK1 based on the reference clock signal RCLK (step S110).

The transmission synchronization circuit 220 included in the master chip 200 may synchronize the data TD to be transmitted in the transmission operation with the first clock signal CLK1 to generate the first data TDAT1 (step S120).

The master chip 200 may transmit the first clock signal CLK1 and the first data TDAT1 together to the slave chip 300 via the first clock pin 202, and the first output driver 232 and the first data pin 204 (step S130), respectively. The first clock signal CLK1 and the first data TDAT1 may be transmitted to the slave chip 300 via the clock wire 122 and the data wire 124, respectively.

The slave chip 300 may receive the first clock signal CLK1 and the first data TDAT1 via the second clock pin 302 and the second data pin 304, respectively. The reception circuit 320 included in the slave chip 300 may receive the first data TDAT1 based on the received first clock signal CLK1' (step S140) and may obtain the data TD.

Referring to FIGS. 2, 3A, 3B, 4, 8 and 10, in performing the reception operation (e.g., in step S200), the transmission circuit 340 or 340a included in the slave chip 300 may set the transmission speed of the data RD to be transmitted in the reception operation based on the first clock signal CLK1' received in the transmission operation such that the transmission speed of the second data RDAT1 is slower than that of the first data TDAT1 (step S210). An operation of setting the transmission speed of the second data RDAT1 may be substantially the same as described with reference to FIGS. 2, 3A, 3B and 4.

The slave chip 300 may transmit the second data RDAT1 to the master chip 200 via the second output driver 314 and the second data pin 304 (step S320).

The data recovery circuit 250 included in the master chip 200 may recover information (e.g., the information D3) included in the second data RDAT1 by sampling the second data RDAT1 based on the first clock signal CLK1' (step S230), and may obtain the data RD. An operation of recovering the information may be substantially the same as described with reference to FIGS. 2, 3A, 3B and 4.

Figure 11:
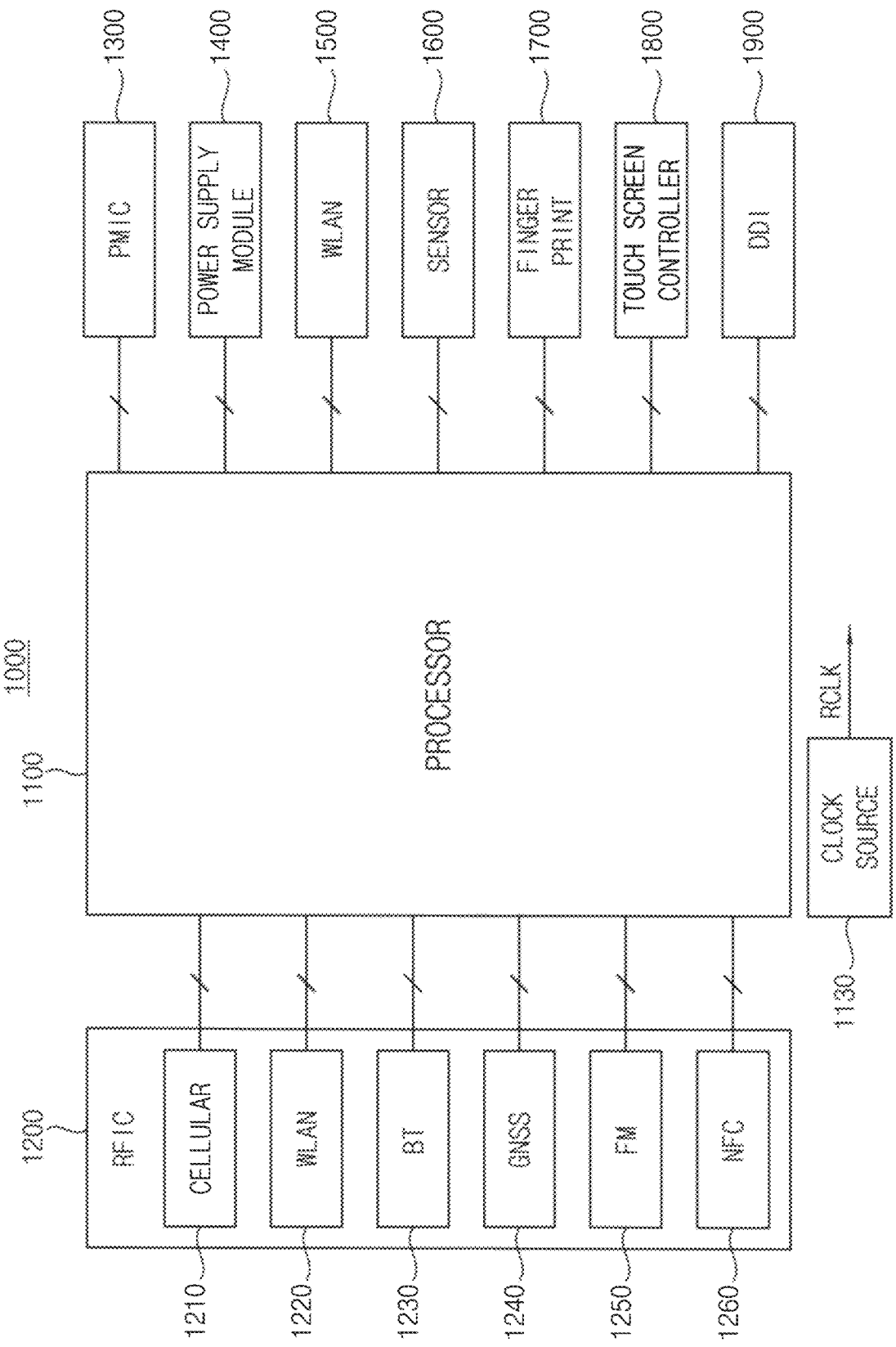
FIG. 11 is a block diagram illustrating a digital processing system according to an example embodiment.

FIG. 11 is a block diagram illustrating a digital processing system according to an example embodiment.

Referring to FIG. 11, a digital processing system 1000 includes a master device 1100 and a plurality of slave devices 1200, 1300, 1400, 1500, 1600, 1700, 1800 and 1900. The digital processing system 1000 may further include a clock source 1130.

The master device 1100 may be a processor which can control each of the slave devices 1200 through 1900. An independent single clock wire and an independent single data wire may be connected between the master device 1100 and each of the slave devices 1200 through 1900. As described above, the master device 1100 may be implemented as a baseband modem processor chip, a chip which can function as both a modem and an AP, an AP, or a mobile AP, but inventive concepts are not limited thereto.

The plurality of slave devices 1200 through 1900 may include a radio frequency integrated circuit(s) (RFIC) 1200, a power management integrated circuit(s) (PMIC) 1300, a power supply module 1400, a wireless local area network (WLAN) module 1500, a sensor 1600, a fingerprint recognition module 1700, a touch screen controller 1800, and display driver IC (DDI) 1900. The RFIC 1200 may include at least one connectivity chip. For example, the connectivity chip may include a chip 1210 for mobile communication, a chip 1220 for WLAN, a chip 1230 for Bluetooth communication, a chip 1240 for global navigation satellite system (GNSS) communication, a chip 1250 for processing FM audio/video, and/or a chip 1260 for near field communication (NFC), but inventive concepts are not limited thereto.

The present disclosure may be used in various integrated circuits, devices and/or systems including the apparatus of transmitting and receiving data such as a personal computer, a laptop computer, a mobile phone, a smart phone, a tablet computer, a PDA, an EDA, a PMP, a digital camera, a music player, a portable game console, a navigation device, a wearable device, an IoT device, an IoE device, an e-book, a VR device, or an AR device.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:
1. A digital processing system comprising:
   a master chip including a first clock pin and a first data pin;
   a first slave chip including a second clock pin and a second data pin; and
   a first single-wire bidirectional data interface connecting the first data pin and the second data pin, wherein the master chip is configured to generate a first clock signal and outputs the first clock signal from the first clock pin to the second clock pin, wherein the digital processing system is configured to transmit a first data from the master chip to the first slave chip only through the first single-wire bidirectional data interface in synchronization with the first clock signal, wherein the digital processing system is configured to transmit a second data from the first slave chip to the master chip, in response to the first data transmitted from the master chip, only through the first single-wire bidirectional data interface without being synchronized with the first clock signal, and wherein no clock signal is transmitted from the first slave chip to the master chip.

2. The digital processing system of claim 1, wherein the first slave chip is configured to underclock the first clock signal received from the master chip to generate a second clock signal.

3. The digital processing system of claim 1, wherein the first slave chip comprises a clock divider.

4. The digital processing system of claim 2, wherein the first clock signal is underclocked through dividing the first clock signal.

5. The digital processing system of claim 4, wherein the first clock signal is divided by N, wherein N is a natural number greater than or equal to two.

6. The digital processing system of claim 1, wherein the master chip comprises a data recovery circuit configured to sample the second data using the first clock signal.

7. The digital processing system of claim 1, wherein the second data is sampled using the first clock signal.

8. The digital processing system of claim 7, wherein the master chip comprises a data recovery circuit configured to sample the second data.

9. The digital processing system of claim 1, wherein the master chip and the first slave chip are mounted on a same printed circuit board (PCB).

10. The digital processing system of claim 1, wherein:
the master chip further includes a third clock pin and a third data pin;
the digital processing system further includes a second slave chip, the second slave chip including a fourth clock pin and a fourth data pin;
the digital processing system further includes a second single-wire bidirectional data interface connecting the third data pin and the fourth data pin;
the master chip is configured to output the first clock signal from the third clock pin to the fourth clock pin;
the digital processing system is configured to transmit a third data from the master chip to the second slave chip only through the second single-wire bidirectional data interface;
the digital processing system is configured to transmit a fourth data from the second slave chip to the master chip only through the second single-wire bidirectional data interface; and
no clock signal is transmitted from the second slave chip to the master chip.

11. The digital processing system of claim 1, further comprising:
a clock source configured to generate a reference clock signal, and
wherein the master chip is configured to generate the first clock signal based on the reference clock signal.

12. The digital processing system of claim 1, wherein the master chip is a baseband modem processor chip, a chip which can function as both a modem and an application processor, or a mobile application processor.

13. The digital processing system of claim 1, wherein the first slave chip is a radio frequency integrated circuit, a power management integrated circuit, a power supply module, a wireless local area network (WLAN) module, a sensor, a fingerprint recognition module, a touch screen controller, or a display driver integrated circuit.

14. A digital processing system comprising:
a master chip including a first clock pin and a first data pin;
a first slave chip including a second clock pin and a second data pin; and
a first single-wire bidirectional data interface connecting the first data pin and the second data pin,
wherein the master chip is configured to generate a clock signal and outputs the clock signal from the first clock pin to the second clock pin,
wherein the digital processing system is configured to transmit a first data from the master chip to the first slave chip through the first single-wire bidirectional data interface in synchronization with the clock signal,
wherein the digital processing system is configured to transmit a second data from the first slave chip to the master chip, in response to the first data transmitted from the master chip, through the first single-wire bidirectional data interface without being synchronized with the clock signal,
wherein the master chip comprises a data recovery circuit which is configured to sample the second data using the clock signal, and
wherein the first slave chip comprises a first clock divider which is configured to divide the clock signal received from the master chip.

15. The digital processing system of claim 14, wherein the clock signal is underclocked through dividing the clock signal.

16. The digital processing system of claim 14, wherein the clock signal is divided by N, wherein N is a natural number greater than or equal to two.

17. The digital processing system of claim 14, wherein the second data is sampled using the clock signal as an oversampling clock signal.

18. The digital processing system of claim 14, wherein the master chip and the first slave chip are mounted on a same printed circuit board (PCB).

19. The digital processing system of claim 14, wherein:
the master chip further includes a third clock pin and a third data pin;
the digital processing system further includes a second slave chip, the second slave chip including a fourth clock pin and a fourth data pin;
the digital processing system further includes a second single-wire bidirectional data interface connecting the third data pin and the fourth data pin;
the master chip is configured to output the clock signal from the third clock pin to the fourth clock pin;
the digital processing system is configured to transmit a third data from the master chip to the second slave chip through the second single-wire bidirectional data interface;
the digital processing system is configured to transmit a fourth data from the second slave chip to the master chip through the second single-wire bidirectional data interface;

the data recovery circuit is configured to sample the fourth data using the clock signal; and the first slave chip comprises a second clock divider which is configured to divide the clock signal received from the master chip.

20. The digital processing system of claim 14, further comprising:
a clock source configured to generate a reference clock signal, and
wherein the master chip is configured to generate the clock signal based on the reference clock signal.

21. The digital processing system of claim 14, wherein the master chip is a baseband modem processor chip, a chip which can function as both a modem and an application processor, or a mobile application processor.

22. The digital processing system of claim 14, wherein the first slave chip is a radio frequency integrated circuit, a power management integrated circuit, a power supply module, a wireless local area network (WLAN) module, a sensor, a fingerprint recognition module, a touch screen controller, or a display driver integrated circuit.

23. A digital processing system comprising:
a master chip including a first clock pin and a first data pin;
a first slave chip including a second clock pin and a second data pin; and
a first single-wire bidirectional data interface connecting the first data pin and the second data pin,
wherein the master chip is configured to generate a clock signal and output the clock signal from the first clock pin to the second clock pin,
wherein the digital processing system is configured to transmit a first data from the master chip to the first slave chip through the first single-wire bidirectional data interface,
wherein the digital processing system is configured to transmit a second data from the first slave chip to the master chip, in response to the first data transmitted from the master chip, through the first single-wire bidirectional data interface, and
wherein the first data is synchronous to the clock signal and the second data is asynchronous to the clock signal.

24. The digital processing system of claim 23, wherein:
the master chip further includes a third clock pin and a third data pin;
the digital processing system further includes a second slave chip, the second slave chip including a fourth clock pin and a fourth data pin;
the digital processing system further includes a second single-wire bidirectional data interface connecting the third data pin and the fourth data pin;
the master chip is configured to output the clock signal from the third clock pin to the fourth clock pin;
the digital processing system is configured to transmit a third data from the master chip to the second slave chip through the second single-wire bidirectional data interface;
the digital processing system is configured to transmit a fourth data from the second slave chip to the master chip through the second single-wire bidirectional data interface; and
the third data is synchronous to the clock signal and the fourth data is asynchronous to the clock signal.

* * * * *